US009983531B2

(12) United States Patent
Kudo et al.

(10) Patent No.: US 9,983,531 B2
(45) Date of Patent: May 29, 2018

(54) MOVING-MEMBER DETECTING DEVICE AND IMAGE FORMING APPARATUS

(71) Applicants: Koichi Kudo, Kanagawa (JP); Koji Masuda, Kanagawa (JP); Hiroyoshi Funato, Kanagawa (JP); Takeshi Ueda, Tokyo (JP); Yasuhiro Nihei, Kanagawa (JP); Atsushi Takaura, Tokyo (JP)

(72) Inventors: Koichi Kudo, Kanagawa (JP); Koji Masuda, Kanagawa (JP); Hiroyoshi Funato, Kanagawa (JP); Takeshi Ueda, Tokyo (JP); Yasuhiro Nihei, Kanagawa (JP); Atsushi Takaura, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 297 days.

(21) Appl. No.: 13/957,926

(22) Filed: Aug. 2, 2013

(65) Prior Publication Data

US 2014/0044460 A1 Feb. 13, 2014

(30) Foreign Application Priority Data

Aug. 7, 2012 (JP) ................................ 2012-174923

(51) Int. Cl.
*G01P 3/36* (2006.01)
*G03G 15/00* (2006.01)

(52) U.S. Cl.
CPC . *G03G 15/5054* (2013.01); *G03G 2215/0129* (2013.01); *G03G 2215/0141* (2013.01)

(58) Field of Classification Search
CPC ............................ G01P 3/64–3/80; G01P 5/00
(Continued)

(56) References Cited

U.S. PATENT DOCUMENTS 3,508,066 A * 4/1970 Agar ......................... G01P 3/36 324/175
4,162,509 A * 7/1979 Robertson ....................... 356/28
(Continued)

FOREIGN PATENT DOCUMENTS

JP 8043057 2/1996
JP 2000-097628 A 4/2000
(Continued)

OTHER PUBLICATIONS

Office Action dated May 10, 2016 in Japanese Application No. 2012-174923.

*Primary Examiner* — Luke D Ratcliffe
(74) *Attorney, Agent, or Firm* — Harness, Dickey & Pierce, P.L.C.

(57) ABSTRACT

A moving-member detecting device includes an image acquiring unit and a speed calculating unit. The image acquiring unit includes a light source configured to emit a light beam to a detecting position of a moving member; an area sensor configured to acquire image data of a one- or two-dimensional image; and an area-sensor control unit configured to acquire the image data. The image acquiring unit is configured to acquire pieces of image data of the moving member at first and second positions, respectively, in a moving direction of the moving member so as to acquire the piece of position image data for the second position when the moving member is at the second position after acquiring the piece of image data for the first position. The speed calculating unit is configured to calculate a moving speed of the moving member from the pieces of image data.

10 Claims, 6 Drawing Sheets

(58) Field of Classification Search
USPC .................................................... 356/28–28.5
See application file for complete search history.

(56) References Cited

U.S. PATENT DOCUMENTS

| | | | | |
|---|---|---|---|---|
| 5,491,642 | A * | 2/1996 | Wormell et al. | 702/49 |
| 5,682,236 | A * | 10/1997 | Trolinger | G01B 11/164 356/28.5 |
| 6,118,132 | A * | 9/2000 | Tullis | G01B 11/16 250/208.1 |
| 7,423,737 | B2 * | 9/2008 | Saxena | G01P 3/68 356/28 |
| 7,948,613 | B2 | 5/2011 | Fourcault et al. | |
| 8,027,516 | B2 | 9/2011 | Kudo et al. | |
| 8,733,884 | B2 * | 5/2014 | Rzadca | B41J 2/2146 347/16 |
| 2003/0142289 | A1 * | 7/2003 | Ortyn | G01N 15/1012 356/28 |
| 2008/0204704 | A1 * | 8/2008 | Rankin | A63B 24/0021 356/28 |
| 2008/0239279 | A1 * | 10/2008 | Krishnaswamy | G01C 21/165 356/5.01 |
| 2010/0045968 | A1 * | 2/2010 | Sikora | G01B 11/043 356/28 |
| 2010/0310284 | A1 | 12/2010 | Funato et al. | |

FOREIGN PATENT DOCUMENTS

| | | | |
|---|---|---|---|
| JP | 2004-338894 | A | 12/2004 |
| JP | 2007-139756 | A | 6/2007 |
| JP | 2009-015240 | A | 1/2009 |
| JP | 2009-511866 | A | 3/2009 |
| JP | 2010-055064 | A | 3/2010 |
| JP | 4545580 | B | 7/2010 |
| JP | 2013-088336 | A | 5/2013 |

* cited by examiner

MOVING-MEMBER DETECTING DEVICE AND IMAGE FORMING APPARATUS

CROSS-REFERENCE TO RELATED APPLICATION

The present application claims priority to and incorporates by reference the entire contents of Japanese Patent Application No. 2012-174923 filed in Japan on Aug. 7, 2012.

BACKGROUND OF THE INVENTION

1. Field of the Invention

The present invention relates to a moving-member detecting device and an image forming apparatus.

2. Description of the Related Art

In recent color image forming apparatuses, so-called tandem-type ones in which four photoreceptors (image carriers) corresponding to four (black, cyan, magenta, yellow) color toners are arranged in parallel have become mainstream. Such a tandem-type image forming apparatus has to transfer respective color toner images developed on photoreceptors so that the toner images are eventually superimposed on one another on a recording medium such as a sheet of paper (regular paper, a postcard, thick paper, and an OHP sheet, etc.); there are two transfer methods: a direct transfer method for directly transferring toner images onto a recording medium in a superimposed manner and an intermediate transfer method for transferring toner images onto an intermediate transfer belt in a superimposed manner and then transferring the superimposed toner image from the intermediate transfer belt to a recording medium. If a conveyance belt for conveying the recording medium in the case of the direct transfer method or the intermediate transfer belt in the case of the intermediate transfer method is not driven with high accuracy, a color registration error may occur.

To drive the intermediate transfer belt with high accuracy, there is a technology of detecting speed of a moving member, such as an intermediate transfer belt, as disclosed in, for example, Japanese Patent No. 4545580, Japanese Patent Application Laid-open No. 2009-015240, and Japanese Patent Application Laid-open No. 2010-055064.

For example, as disclosed in Japanese Patent Application Laid-open No. 2009-015240, in a case of detecting a speed vector of a speckle and performing speed control on the basis of a result of the detection, there are problems that it is difficult to detect the speed with high accuracy because the speed is calculated from displacement in a small section, and the calculated speed is discretized by pixel size of a camera, and when a belt conveyed position is calculated by integrating the speed, an error is also integrated, and therefore accurate positioning is not possible. Furthermore, there is a problem that when a distance between a CMOS sensor and an imaging lens or a distance between the imaging lens and an object (a moving member) is changed according to temperature characteristics or a detecting distance change, the imaging magnification is changed, and this causes a measurement error in measured speed.

Therefore, there is a need to provide a moving-member detecting device and image forming apparatus capable of measuring moving speed with high accuracy without causing an measurement error even if a distance between an area sensor, such as a CMOS sensor, and an imaging lens or a distance between the imaging lens or the like and a moving member is changed according to temperature characteristics or a detecting distance change.

SUMMARY OF THE INVENTION

It is an object of the present invention to at least partially solve the problems in the conventional technology.

According to an embodiment, there is provided a moving-member detecting device that includes an image acquiring unit and a speed calculating unit. The image acquiring unit includes a light source configured to emit a light beam to a detecting position of a moving member; an area sensor configured to acquire image data of a one- or two-dimensional image; and an area-sensor control unit configured to acquire the image data acquired by the area sensor in response to a trigger signal. The image acquiring unit is configured to acquire pieces of image data of the moving member at a first position and a second position, respectively, in a moving direction of the moving member so that the image acquiring unit acquires the piece of position image data for the second position when the moving member is at the second position after acquiring the piece of image data for the first position. The speed calculating unit is configured to calculate a moving speed of the moving member from the piece of image data for the first position and the piece of image data for the second position.

According to another embodiment, there is provided an image forming apparatus that includes the moving-member detecting device according to the above embodiment, wherein the moving member is an intermediate transfer belt or a conveying belt.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A moving-member detecting device according to embodiments of the present invention will be explained below with reference to FIGS. 1 to 7.

A moving-member detecting device 50 according to an embodiment is included, for example, in a multicolor image forming apparatus, and detects actual speed of a moving member, such as an intermediate transfer belt in an image forming apparatus using an intermediate transfer method or a conveyance belt for conveying a recording medium to a transfer position in an image forming apparatus using a direct transfer method. For example, as shown in FIG. 1, the image forming apparatus is designed to move (rotate) an endless-belt-like moving member E supported by a drive roller R1 and driven rollers R2 and R3 in a clockwise direction in FIG. 1, and includes the moving-member detecting device 50 and a motor 81.

Figure 1:
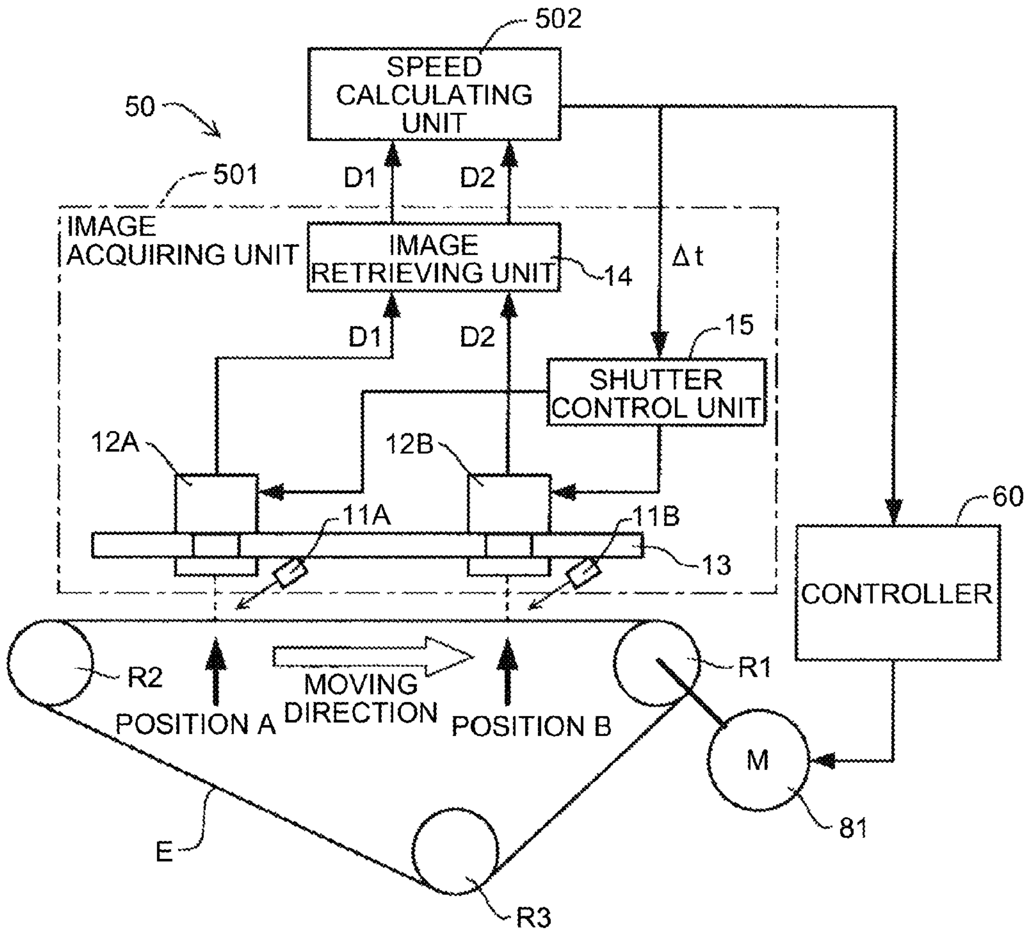
FIG. 1 is a configuration diagram of a moving-member detecting device, a first example of an image acquiring unit, and a part for moving a moving member according to one embodiment of the present invention.
Figure 2:
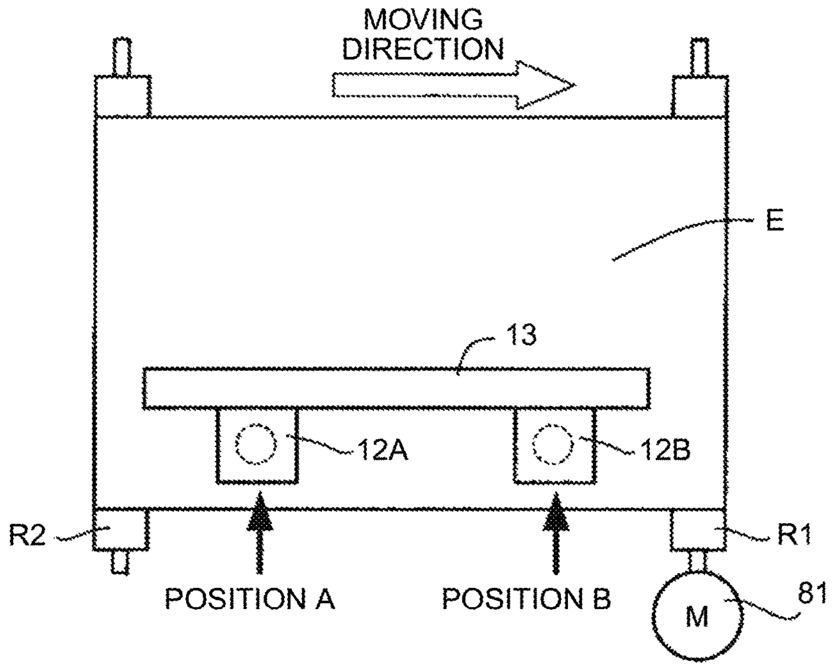
FIG. 2 is a schematic plan view of the moving-member detecting device, the first example of the image acquiring unit, and the part for moving the moving member according to the embodiment.

As shown in FIG. 1, the moving-member detecting device 50 includes an image acquiring unit 501 and a speed calculating unit 502. Furthermore, two positions with respect to the moving member E: a position A as a "front position" and a position B as a "back position" have been set in the moving-member detecting device 50. The image acquiring unit 501 includes a laser light source 11A which emits a laser light as an "light beam" to the position A, a laser light source 11B which emits a laser light as an "light beam" to the position B, an area sensor 12A placed in the position A, an area sensor 12B placed in the position B, an image retrieving unit 14, and a shutter control unit 15. The laser light sources 11A and 11B may be semiconductor lasers, which have a longer life and are stable. The area sensors 12A and 12B are an area sensor capable of acquiring a two-dimensional image.

The speed calculating unit 502 is made up of a microcomputer and the like, and calculates actual speed of the moving member E on the basis of position-A image data DA and position-B image data DB from the image retrieving unit 14 as will be described later and outputs data on a time difference Δt for adjusting shutter timing between the area sensors 12A and 12B to the shutter control unit 15. Furthermore, the speed calculating unit 502 outputs data on the calculated actual speed to a higher-level controller 60 that controls the entire image forming apparatus, and the controller 60 controls the rotation of the motor 81.

The laser light sources 11A and 11B include a light-emitting element, which emits laser light, and a collimating lens, which makes a laser beam emitted from the light-emitting element into a substantially parallel laser light. The laser light sources 11A and 11B emit a laser light to the moving member E. The laser light sources 11A and 11B are arranged so as to emit a laser light to the outer surface of the moving member E from an oblique direction.

The moving member E is a belt-like member having a scattering property in the surface or inside thereof. Therefore, when a laser light is emitted to the moving member E, the moving member E diffusely reflects the laser light as a reflected light, and an image including spots called a speckle (a speckle pattern) is obtained. This speckle pattern is formed by the interference of the laser light corresponding to the uneven surface or inside of the moving member E; when the moving member E is moved, the speckle pattern is also moved while maintaining the pattern shape. The speckle acts as a virtual mark on the target moving member E, and speed of the moving member E is detected by detecting the movement of the speckle pattern which is the mark.

The area sensors 12A and 12B take an image of a part of the moving member E exposed to the laser light, and output two-dimensional image data. As the area sensors 12A and 12B, for example, a CCD (Charge Coupled Device) sensor, a CMOS (Complementary Metal-Oxide Semiconductor) sensor, and a photodiode array, etc. can be used.

In the present embodiment, sensors which output two-dimensional image data are used as the area sensors 12A and 12B, and are fixed to a fixed member 13. The area sensors 12A and 12B are placed so that their light receiving surfaces are parallel to the outer surface of the moving member E at a distance, and are arranged in the position A and the position B, respectively, to be kept apart in a moving direction of the moving member E. Consequently, an image including the reflected light from the moving member E (i.e., the speckle pattern) is input to the area sensors 12A and 12B. Then, the area sensors 12A and 12B output two-dimensional image data showing the image. Incidentally, in a case of using area sensors which output one-dimensional image data, the area sensors are arranged so that the long sides of the area sensors are parallel to the moving direction X of the moving member E. Furthermore, in the present embodiment, the area sensors 12A and 12B are directly opposed to the moving member E; however, the present invention is not limited to this, and, as described in variations of the embodiment, an optical member, which may function as an optical-beam splitting unit or an optical image synthesizing unit, and the like can be placed between the moving member E and the area sensors.

Figure 3:
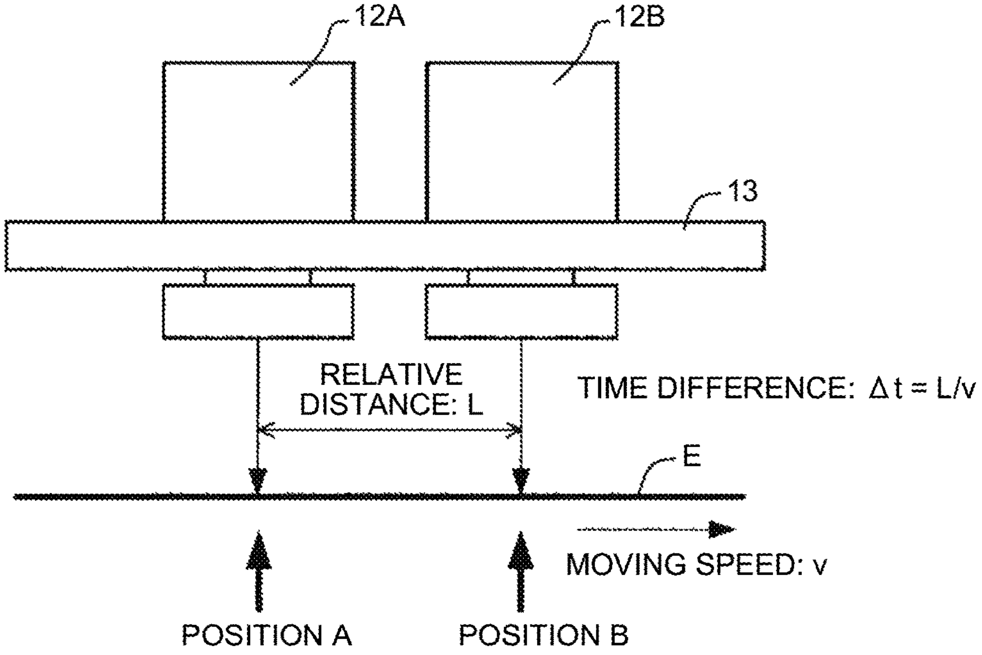
FIG. 3 is a diagram for explaining spacing and a time difference between a position A and a position B in the moving-member detecting device according to the embodiment and a relation with the moving side.

The speed calculating unit 502 generates the time difference Δt which is a difference in timing for the image retrieving unit 14 to acquire image data D. Specifically, as shown in FIG. 3, when a target speed of the moving member E is denoted by v [mm/s], and a relative distance between the area sensor 12A in the position A and the area sensor 12B in the position B is denoted by L [mm], the time difference Δt [s] is calculated by the following Equation (1).

$$\Delta t = L/v \tag{1}$$

The speed calculating unit 502 acquires the target speed v of the moving member E, for example, from the higher-level controller 60 that controls the entire image forming apparatus, and calculates a time difference Δt by dividing the relative distance L by the target speed v. Then, the speed calculating unit 502 generates the time difference Δt and outputs the generated time difference Δt to the shutter control unit 15.

The image retrieving unit 14 periodically acquires position-A image data D1 output from the area sensor 12A placed in the position A and position-B image data D2 output from the area sensor 12B placed in the position B. Specifically, the shutter control unit 15 controls the shutter timing of the area sensor 12A, and further controls the shutter timing of the area sensor 12B on the basis of the time difference Δt input from the speed calculating unit 502. By this shutter timing control, the image retrieving unit 14 acquires position-A image data D1 at a time t0, and then acquires position-B image data D2 at a time t0+Δt based on the time difference Δt. Then, the image retrieving unit 14 inputs the position-A image data D1 and the position-B image data D2 to the speed calculating unit 502.

The speed calculating unit 502 detects actual speed Vr of the moving member E on the basis of correlation image data Dg obtained by performing a cross-correlation operation on the position-A image data D1 and the position-B image data D2. The cross-correlation operation performed by the speed calculating unit 502 is expressed by the following Equation (2), where D1 denotes position-A image data, D2 denotes position-B image data, F[ ] denotes Fourier transform, $F^{-1}$[ ] denotes inverse Fourier transform, "*" denotes complex conjugate, and "@" denotes cross-correlation operation:

$$D1@D2^* = F^{-1}[F[D1]\cdot F[D2]^*] \quad (2)$$

By performing the cross-correlation operation D1@D2* on the position-A image data D1 and the position-B image data D2, the correlation image data Dg is obtained. Here, the position-A image data D1 and the position-B image data D2 are two-dimensional image data, so the correlation image data Dg is also two-dimensional image data. If the position-A image data D1 and the position-B image data D2 are one-dimensional image data, the correlation image data Dg is also one-dimensional image data.

If broad brightness distribution of the correlation image data Dg is a problem, phase-only correlation can be used. This phase-only correlation is expressed by the following equation, where P[ ] denotes that only a phase is extracted from complex amplitude (amplitudes are all set to 1).

$$D1@D2^* = F^{-1}[P[F[D1]]\cdot P[F[D2]^*]]$$

In this manner, by using the phase-only correlation, a position shift amount (a correlation distance J) between first-part image data D1 and second-part image data D2 can be calculated with high accuracy even in the case of broad brightness distribution.

This correlation image data Dg shows a correlation between the position-A image data D1 and the position-B image data D2; the higher the degree of matching between an A image G1 indicated by the position-A image data D1 and a B image G2 indicated by the position-B image data D2, the closer point to the center position O of an image Gg indicated by the correlation image data Dg the steep peak (correlation peak) brightness appears at, and when the A image G1 matches the B image G2, the center position O of the correlation image data Dg overlaps with a peak position P.

Then, in the present embodiment, the time difference Δt is set to a value obtained by dividing the relative distance L between the position A and the position B by the target speed v of the moving member E, so when the actual speed of the moving member E is consistent with the target speed v, an A image in the position A moves to the position B after the elapse of the time difference Δt; that is, the A image indicated by position-A image data D1 matches a B image indicated by position-B image data D2 acquired after the elapse of the time difference Δt.

Namely, if the actual speed of the moving member E is consistent with the target speed v, the center position of the correlation image data Dg overlaps with the peak position; on the other hand, if the actual speed of the moving member E is different from the target speed v, the center position of the correlation image data Dg and the peak position are misaligned by a difference between the actual speed and the target speed v. Accordingly, in the correlation image data Dg, a distance (correlation distance J) from the center position of the image Gg indicated by the correlation image data Dg to the steepest peak position indicates a speed deviation ΔV between the target speed v and the actual speed of the moving member E.

Therefore, by performing an operation for searching for the steepest peak on the correlation image data Dg, a speed deviation ΔV between the target speed v and the actual speed of the moving member E can be calculated. In a method using such a cross-correlation operation, fast Fourier transform can be used, and therefore, a speed deviation ΔV, i.e., actual speed of a moving member can be detected with a relatively small amount of calculation and a high degree of accuracy.

As the area sensors 12A and 12B, a camera equipped with a CMOS sensor or a CCD sensor can be used. When the moving speed of the moving member E is fast, an image with less image shift can be obtained by using a sensor having a global shutter function. Furthermore, the area sensors 12A and 12B are held by the fixed member 13 so as to keep them at a certain relative distance L in the moving direction of the moving member E; it is preferable that the fixed member 13 is a member that fixes the area sensors 12A and 12B so as to keep their positions unchanged and is made of a material that changes with environment as little as possible. If a glass material with a linear expansion coefficient of 0 can be used, it is possible to perform the highly-accurate measurement. In general, in an image forming apparatus, even iron sheet metal can provide sufficient accuracy.

Incidentally, the image taking timing between the area sensors 12A and 12B is determined by the time difference Δt; however, the image taking timing can be arbitrarily determined according to required resolution. Furthermore, target speed is set so as to meet the following equations:

$$v+dv=(L+dL)/\Delta t$$

$$v=L/\Delta t,$$

where v denotes the target speed, dv denotes a speed error, L denotes a relative distance, dL denotes a position shift amount obtained by a correlation operation, Δt(s) denotes a time difference, and actual speed is equal to the target speed v plus the speed error dv; therefore, a deviation from the target speed can be calculated by the following Equation.

$$dv=dL/\Delta t$$

By performing feedback control based on the calculated speed deviation, belt conveyance speed can be controlled to be maintained constant.

It is described above that actual speed of a moving member can be accurately measured by using the two area sensors 12A and 12B; in this configuration, even if the imaging magnification of the area sensors 12A and 12B is changed according to a change in environmental temperature, as long as the relative distance L remains unchanged, a position shift amount of an image is calculated to be zero when the speed is v, and therefore is not affected by the change in magnification. Furthermore, when there is a speed error, dL is affected by the change in magnification, so dL includes a measurement error; however, when dv with respect to v is small, dL is also small, and therefore a deviation is a very small value. For example, when there is a speed error dv of about 1% of the target speed v, even if the magnification is changed by 1% according to a change in temperature, a measurement error with respect to the target speed v is only 0.01×0.01=0.0001 (0.01%). As described above, if speed measurement using an image correlation is performed in accordance with the present invention, highly-accurate speed measurement is easily achieved, and it is possible to provide a high-accuracy belt speed measurement device.

In the above-described embodiment, actual speed of the moving member E is detected on the basis of correlation image data Dg obtained by performing a cross-correlation operation using Fourier transform on position-A image data D1 and position-B image data D2; however, the present invention is not limited to this. A method of detecting actual speed of the moving member E on the basis of position-A image data D1 and position-B image data D2 is optional unless it is not contrary to the purpose of the invention; for example, a correlation distance J can be obtained by directly comparing the brightness between position-A image data D1 and position-B image data D2 in such a manner that brightness included in the position-A image data D1 and the position-B image data D2 is binarized to "0" if the brightness is not more than a predetermined threshold or "1" if the brightness is more than the threshold.

Figure 4A:
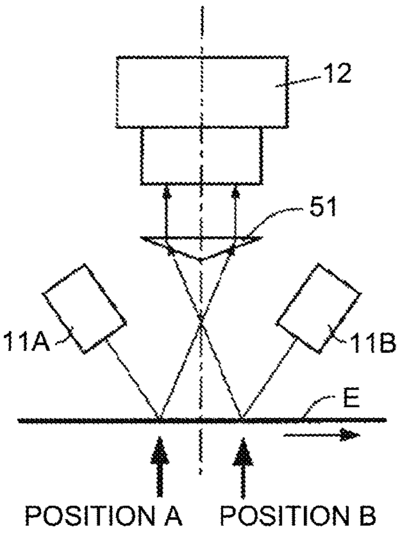
FIG. 4A is a schematic configuration diagram showing a second example of the image acquiring unit according to the embodiment.
Figure 4B:
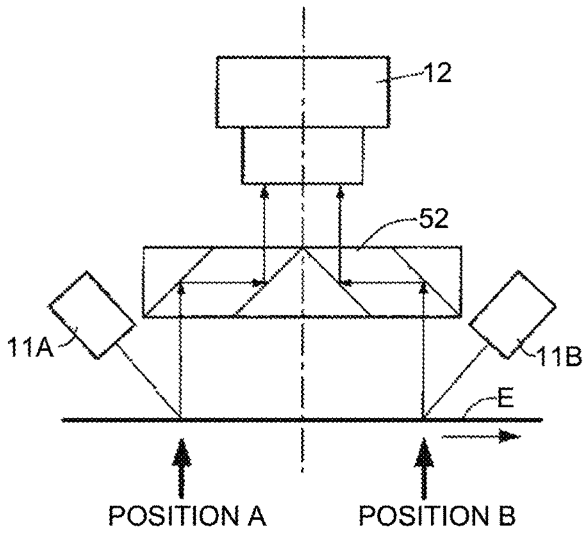
FIG. 4B is a schematic configuration diagram showing a third example of the image acquiring unit according to the embodiment.
Figure 5:
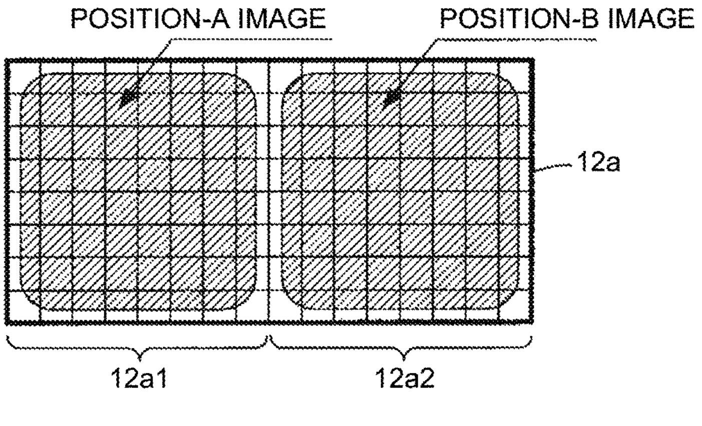
FIG. 5 is a diagram for explaining an imaging area of an area sensor in the second and third examples.

FIG. 4A is a schematic configuration diagram showing a second example of the image acquiring unit, and FIG. 4B is a schematic configuration diagram showing a third example of the image acquiring unit. FIG. 5 is a diagram for explaining an imaging area of an area sensor in the second and third examples.

The second example shown in FIG. 4A is an example of an image acquiring unit using a prism 51; in this example, the laser light source 11A emits a laser light to the moving member E toward the position A, and the prism 51 receives a reflected light from the position A on one side thereof and lets the received light into one side of the visual field of one area sensor 12. The laser light source 11B emits a laser light to the moving member E toward the position B, and the prism 51 receives a reflected light from the position B on the other side thereof and lets the received light into the other side of the visual field of the area sensor 12. The laser light sources 11A and 11B are arranged so as to emit a laser light L to the outer surface of the moving member E from an oblique direction.

The third example shown in FIG. 4B is an example of an image acquiring unit using a mirror 52; in this example, the laser light source 11A emits a laser light to the moving member E toward the position A, and the mirror 52 receives a reflected light from the position A on one side through an entrance port thereof and lets the received light into one side of the visual field of one area sensor 12. The laser light source 11B emits a laser light to the moving member E toward the position B, and the mirror 52 receives a reflected light from the position B through the other side of the entrance port thereof and lets the received light into the other side of the visual field of the area sensor 12.

In the area sensor 12 in the above-described second and third examples, as shown in FIG. 5, a light receiving region **12*a*1 on one half side of a light receiving surface 12*a* receives a light corresponding to an A-position image, and a light receiving region 12*a*2 on the other half side receives a light corresponding to a B-position image. In this manner, the image acquiring unit is composed of one area sensor 12, and the area sensor 12** can take images of two areas at the same time; therefore, the number of parts and the size of the device can be reduced, which reduces the cost.

Figure 6A:
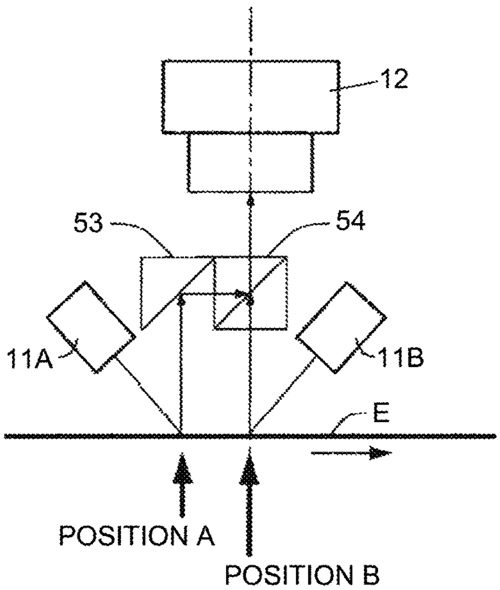
FIG. 6A is a schematic configuration diagram showing a fourth example of the image acquiring unit according to the embodiment.

FIG. 6A is a schematic configuration diagram showing a fourth example of the image acquiring unit. In this fourth example, a reflected light from the position A and a reflected light from the position B are guided coaxially to one area sensor 12 by means of mirrors. The light source 11A emits a laser light to the position A, and a reflected light from the position A is reflected by a first mirror 53 and a second mirror 54, which is a half mirror, and enters the area sensor 12. The light source 11B emits a laser light to the position B, and a reflected light from the position B passes through the second mirror 54, which is a half mirror, and enters the area sensor 12.

Figure 6B:
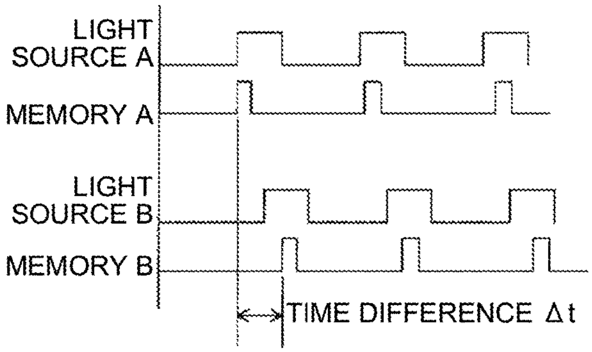
FIG. 6B illustrates the exposure timing of the light sources in the fourth example.

Namely, the image acquiring unit according to the fourth example is a unit having a function of synthesizing respective images of two imaging areas on the same axis of the area sensor 12. If the two imaging areas located in the A and position Bs are exposed to laser lights at the same time, two images with an overlap are developed; therefore, the exposure timings of the light source 11A (a light source A) and the light source 11B (a light source B) are staggered as shown in FIG. 6B, thereby controlling the image capturing timings of a memory area for an A-position image (a memory A) and a memory area for a B-position image (a memory B) to be staggered by the time difference Δt.

In the second and third examples, the image acquiring unit is configured to form images of two areas onto the different regions **12*a*1 and 12*a*2 of the area sensor 12, respectively. However, in this fourth example, two images are formed onto the center of the optical axis of the area sensor 12**; therefore, for example, even if the imaging magnification of a lens is changed, the central position of the images remains unchanged, so it is possible to achieve the high-accuracy detection even if the magnification is changed.

Figure 7A:
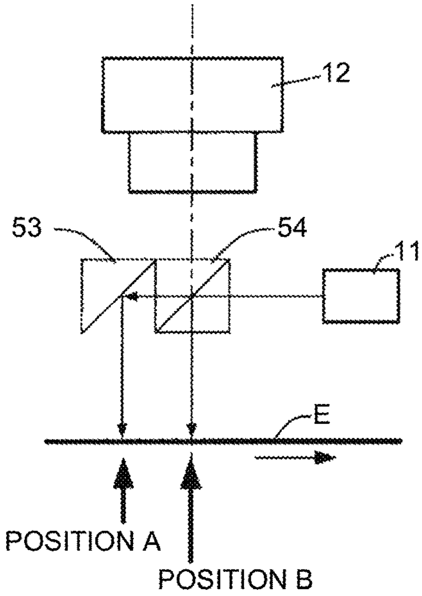
FIG. 7A is a schematic configuration diagram showing a fifth example of the image acquiring unit according to the embodiment.
Figure 7B:
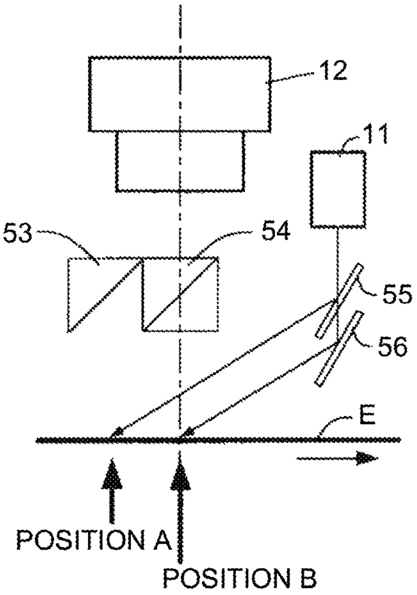
FIG. 7B is a schematic configuration diagram showing a sixth example of the image acquiring unit according to the embodiment.

FIG. 7A is a schematic configuration diagram showing a fifth example of the image acquiring unit, and FIG. 7B is a schematic configuration diagram showing a sixth example of the image acquiring unit. In the fifth example shown in FIG. 7A, a portion of a laser light emitted from a light source 11 passes through the second mirror 54, which is a half mirror, and is reflected by the first mirror 53 and falls onto the position A. A reflected light from the position A is reflected by the first mirror 53 and the second mirror 54, which is a half mirror, and enters the area sensor 12. Furthermore, the rest of the laser light emitted from the light source 11 is reflected by the second mirror 54, which is a half mirror, and falls onto the position B. A reflected light from the position B passes through the second mirror 54, which is a half mirror, and enters the area sensor 12.

In the sixth example shown in FIG. 7B, a portion of a laser light emitted from the light source 11 is reflected by a third mirror 55, which is a half mirror, and falls onto the position A. A reflected light from the position A is reflected by the first mirror 53 and the second mirror 54, which is a half mirror, and enters the area sensor 12. Furthermore, the rest of the laser light emitted from the light source 11 passes through the third mirror 55, which is a half mirror, and is reflected by a fourth mirror 56, and then falls onto the position B. A reflected light from the position B passes through the second mirror 54, which is a half mirror, and enters the area sensor 12.

In the fifth and sixth examples, one light source is used, thereby achieving the reduction in the number of illumination light sources and the improvement in consistency of an illumination pattern and correlation and providing the high-accuracy detection. Respective timings to capture an A-position image and a B-position image are the same as in the fourth example explained with reference to FIG. 6B. Furthermore, when a laser is used as a light source, the coherency is constant, so the consistency of a speckle is improved, and the highly-accurate measurement can be achieved. Moreover, by providing a light entrance port to an image synthesizing unit, coaxial irradiation can be achieved by means of one light source. Furthermore, by the application of an optical system capable of oblique incidence of a light from a light source, an amount of speckle scattered light caused by surface roughness can be increased.

Figure 8:
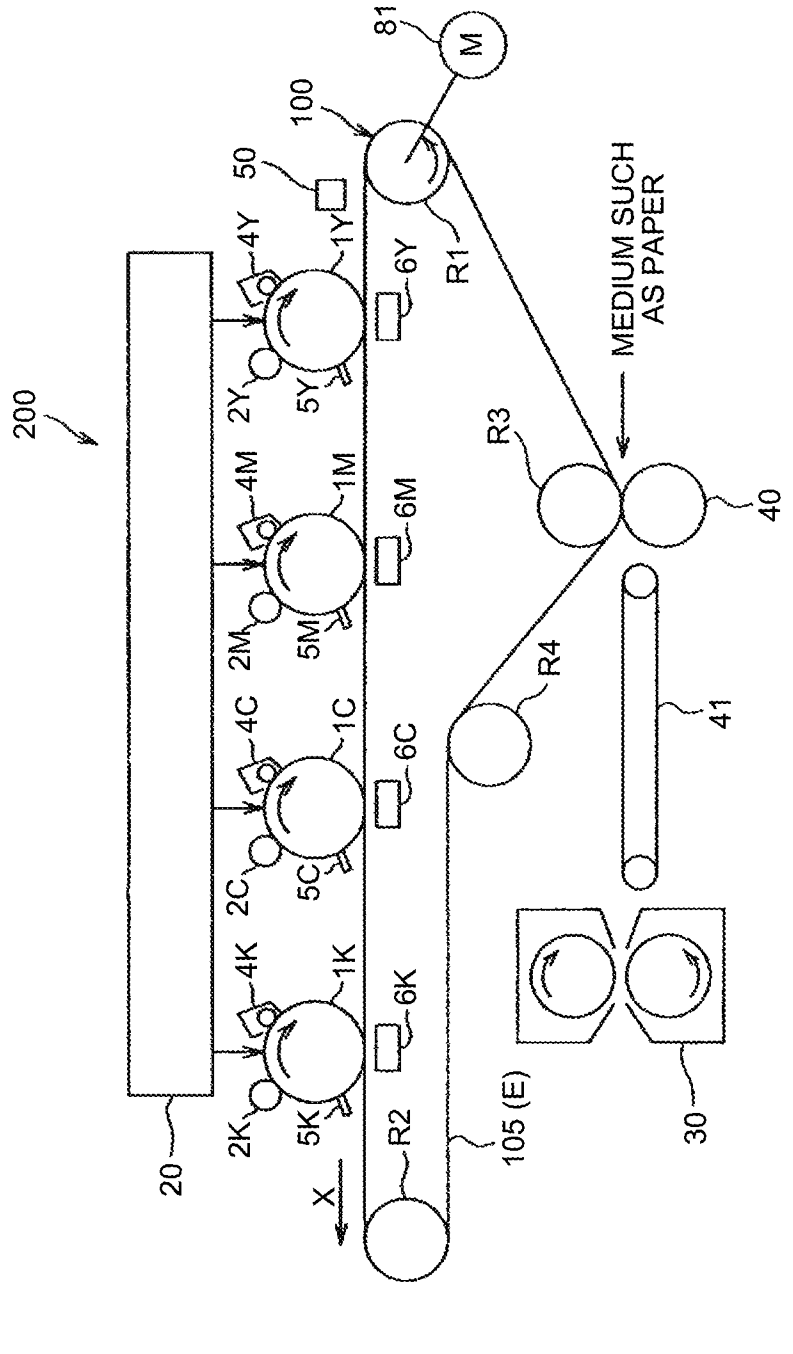
FIG. 8 is a schematic configuration diagram showing an intermediate transfer method of image forming apparatus according to one embodiment of the present invention.

Subsequently, an image forming apparatus according to one embodiment of the present invention is explained below with reference to FIGS. 8 and 9. FIG. 8 shows a basic configuration example of a multicolor image forming apparatus (denoted by a reference numeral 200 in FIG. 8) according to one embodiment of the present invention. In FIG. 8, reference numerals 1Y, 1M, 1C, and 1K denote image carriers arranged in parallel along an intermediate transfer belt 105, and these image carriers are photosensitive drums. The photosensitive drums 1Y, 1M, 1C, and 1K rotate in a direction of arrow. Chargers 2Y, 2M, 2C, and 2K which are charging means (here, a contact-type charging roller is illustrated; besides this, a charging brush and a non-contact corona charger, etc. can be used), developing units 4Y, 4M, 4C, and 4K which are developing means, primary transfer units (such as transfer chargers, transfer rollers, or transfer brushes) 6Y, 6M, 6C, and 6K, and photosensitive-drum cleaning units 5Y, 5M, 5C, and 5K, etc. are arranged around the photosensitive drums 1Y, 1M, 1C, and 1K, respectively. Furthermore, in FIG. 8, a reference numeral 30 denotes a fixing unit, a reference numeral 40 denotes a secondary transfer unit, and a reference numeral 41 denotes a conveying unit.

The image forming apparatus 200 is an intermediate transfer method of multicolor image forming apparatus, and includes a moving-member conveying unit 100 for conveying an intermediate transfer belt. In this moving-member conveying unit 100, the intermediate transfer belt 105 as a moving member E is supported by the drive roller R1 and the driven rollers R2, R3, and R4, and the motor 81 drives the intermediate transfer belt 105 (the drive roller R1) to rotate in a counterclockwise direction in FIG. 8. Furthermore, the above-described moving-member detecting device 50 detects actual speed information, such as a speed deviation ΔV and actual speed Vr as described above, of the intermediate transfer belt 105, and a motor control unit 82 controls the motor 81 on the basis of the actual speed information so that the intermediate transfer belt 105 rotates at target speed Vt. The motor control unit 82 and a higher-level controller 60 of the image forming apparatus are not shown in FIG. 8.

The photosensitive drums 1Y, 1M, 1C, and 1K are uniformly charged by the chargers 2Y, 2M, 2C, and 2K, respectively, and then are exposed to intensity-modulated light beams (for example, laser lights) corresponding to image information by an optical scanning device 20 which is a latent-image forming means.

Electrostatic latent images formed on the photosensitive drums 1Y, 1M, 1C, and 1K are developed into visible yellow (Y), magenta (M), cyan (C), and black (K) toner images by the Y developing unit 4Y, the M developing unit 4M, the C developing unit 4C, and the K developing unit 4K, respectively.

The toner images on the photosensitive drums 1Y, 1M, 1C, and 1K, which have been developed at the above-described developing process, are sequentially primary-transferred onto the intermediate transfer belt 105 in a superimposed manner. Then, the superimposed four-color toner image on the intermediate transfer belt 105 is secondary-transferred onto a recording medium such as a sheet of paper which has been fed by a sheet feeding unit (not shown) and conveyed to a position of the secondary transfer unit 40 through a conveying means (not shown). Then, the recording medium onto which the four-color toner image has been transferred is conveyed to the fixing unit 30 by the conveying unit 41 such as a conveying belt, and the four-color toner image is fixed on the recording medium by the fixing unit 30, thereby a multi- or full-color image is obtained. After the fixing, the recording medium is discharged into a copy receiving tray (not shown) or a post-processing apparatus (not shown), etc.

Furthermore, after the primary transfer of the toner images, the photosensitive drums 1Y, 1M, 1C, and 1K are cleaned by cleaning members (blades or brushes, etc.) of the cleaning units 5Y, 5M, 5C, and 5K, respectively, to remove residual toners. Moreover, after the secondary transfer of the four-color toner image, the intermediate transfer belt 105 is cleaned by a belt cleaning unit (not shown) to remove residual toners.

The image forming apparatus 200 shown in FIG. 8 has four modes of image formation: a single color mode in which a single-color image in any one of yellow (Y), magenta (M), cyan (C), and black (K) colors is formed, a two-color mode in which a two-color image is formed by superimposing two color images in any two of yellow (Y), magenta (M), cyan (C), and black (K) colors, a three-color mode in which a three-color image is formed by superimposing three color images in any three of yellow (Y), magenta (M), cyan (C), and black (K) colors, and a full-color mode in which a superimposed four-color image is formed as described above; therefore, the image forming apparatus 200 is capable of single-, multi-, and full-color image formation. For example, a user specifies any of these modes through an operation unit (not shown), and the image forming apparatus 200 forms an image in accordance with the specified mode.

Figure 9:
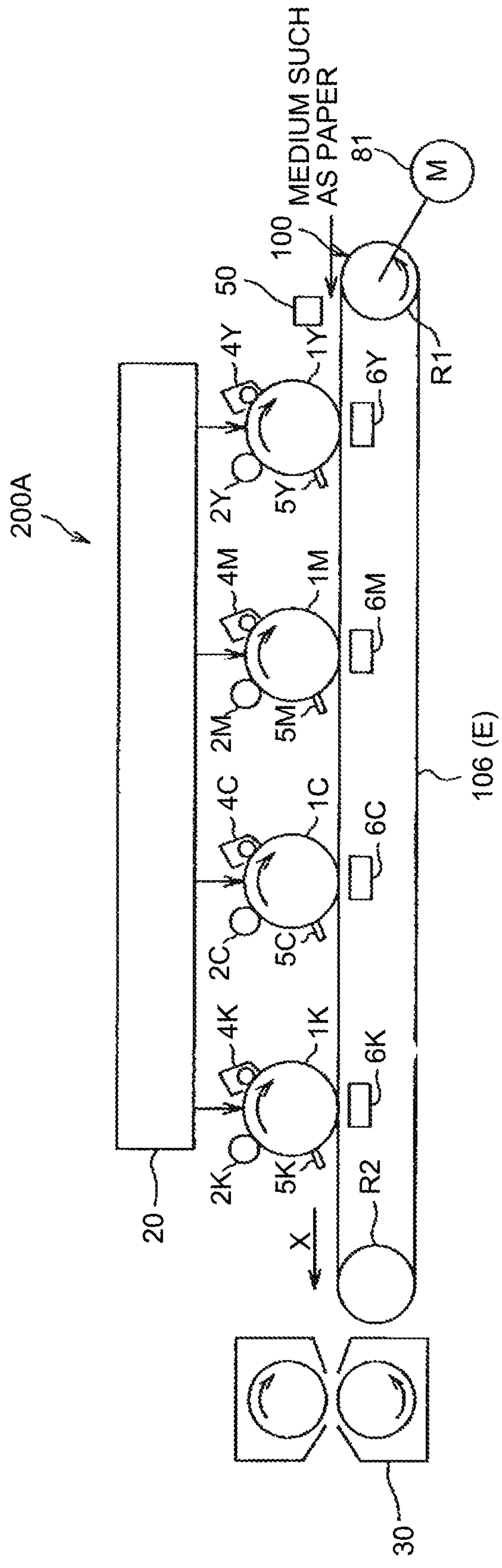
FIG. 9 is a schematic configuration diagram showing a direct transfer method of image forming apparatus according to one embodiment of the present invention.

Furthermore, the image forming apparatus 200 shown in FIG. 8 is an intermediate transfer method of multicolor image forming apparatus and has a configuration using the intermediate transfer belt 105, that is, the image forming apparatus 200 is configured to form a superimposed toner image by primary-transfer of respective toner images from the photosensitive drums 1Y, 1M, 1C, and 1K to the intermediate transfer belt 105 and then secondary-transfer the superimposed toner image from the intermediate transfer belt 105 to a recording medium such as a sheet of paper; alternatively, like a multicolor image forming apparatus shown in FIG. 9 (denoted by a reference numeral 200A in FIG. 9), it can be configured as a direct transfer method of multicolor image forming apparatus that uses, as a moving member E for carrying/conveying a recording medium such as a sheet of paper, a conveying belt 106 instead of an intermediate transfer belt, and directly transfers toner images from the photosensitive drums 1Y, 1M, 1C, and 1K to the recording medium. In this direct transfer method of image forming apparatus 200A, as shown in FIG. 9, an entry route of a recording medium such as a sheet of paper is different from that shown in FIG. 8, and the conveying belt 106 conveys a recording medium toward the photosensitive drums 1Y, 1M, 1C, and 1K.

The image forming apparatus 200A includes the moving-member conveying unit 100 for conveying the conveying belt 106. In this moving-member conveying unit 100, the conveying belt 106 as a moving member E is supported by the drive roller R1 and the driven roller R2, and the motor 81 drives the conveying belt 106 (the drive roller R1) to rotate in a counterclockwise direction in FIG. 9 (a moving direction X). Furthermore, the above-described moving-member detecting device 50 detects actual speed information, such as a speed deviation ΔV and actual speed Vr as described above, of the conveying belt 106, and the motor control unit 82 controls the motor 81 on the basis of the actual speed information so that the conveying belt 106 rotates at target speed Vt. The motor control unit 82 and the higher-level controller 60 of the image forming apparatus are not shown in FIG. 9.

In the same manner as the image forming apparatus 200, also in the image forming apparatus 200A, the photosensitive drums 1Y, 1M, 1C, and 1K are uniformly charged by the chargers 2Y, 2M, 2C, and 2K, respectively, and are exposed to intensity-modulated light beams (for example, laser lights) corresponding to image information by the optical scanning device 20 which is a latent-image forming means, and then electrostatic latent images are formed.

The electrostatic latent images formed on the photosensitive drums 1Y, 1M, 1C, and 1K are developed into visible Y, M, C, and K toner images by the Y developing unit 4Y, the M developing unit 4M, the C developing unit 4C, and the K developing unit 4K, respectively.

A recording medium, such as a sheet of paper, is fed by the sheet feeding unit (not shown) at the timing along with the developing process, and conveyed to the conveying belt 106 through the conveying means (not shown), and then carried on the conveying belt 106. The recording medium carried on the conveying belt 106 is conveyed toward the photosensitive drums 1Y, 1M, 1C, and 1K, and the toner images on the photosensitive drums 1Y, 1M, 1C, and 1K, which have been developed at the above-described developing process, are sequentially transferred onto the recording medium in a superimposed manner. Then, the recording medium onto which the superimposed four-color toner image has been transferred is conveyed to the fixing unit 30, and the four-color toner image is fixed on the recording medium by the fixing unit 30, thereby a multi- or full-color image is obtained. After the fixing, the recording medium is discharged into the copy receiving tray (not shown) or the post-processing apparatus (not shown), etc.

Furthermore, after the transfer of the toner images, the photosensitive drums 1Y, 1M, 1C, and 1K are cleaned by cleaning members (blades or brushes, etc.) of the cleaning units 5Y, 5M, 5C, and 5K, respectively, to remove residual toners.

As described above, the image forming apparatuses 200 and 200A include the moving-member conveying unit 100, so actual speed Vr of the intermediate transfer belt 105 or the conveying belt 106 can be calculated in a short time and accurately detected by the moving-member detecting device 50 of the moving-member conveying unit 100; therefore, by feedback of information on the actual speed Vr and the like to the motor 81, a speed fluctuation of the belt can be controlled to nearly zero, and as a result, it is possible to provide a high-quality color image in which image expansion/contraction and color shift are reduced and suppressed. Furthermore, as for a belt- or roller-like member used as the fixing unit, a speed fluctuation of the fixing unit can be detected and corrected by using the above-described moving-member detecting device 50.

Moreover, a result of detection of a speed fluctuation of the intermediate transfer belt or the conveying belt can be fed back to a write-start-position correcting means (for example, a liquid-crystal deflection element provided in the optical scanning device 20) for correcting the write start position of the optical scanning device 20. By application of voltage to a liquid crystal, the liquid-crystal deflection element can shift the position of a light that reaches a photosensitive drum to a direction parallel to the rotation direction of the photosensitive drum. When there is a speed fluctuation of the belt, this may cause an error in superimposition of respective color images or the expansion/contraction of the images; however, in the same manner as the correction of a speed fluctuation of the belt, by using the liquid-crystal deflection element, the forming positions of toner images and the expansion/contraction of the images can be corrected; as a result, a high-quality output image without color shift and image expansion/contraction can be obtained.

The above embodiment describes the image forming apparatus; however, the present invention is not limited to this, and can be applied to any devices and systems that need to detect the speed of a moving member which moves in one direction.

The area sensor may be configured to acquire a two-dimensional image, and the moving speed of the moving member and a movement of the moving member in a direction perpendicular to a conveying direction may be simultaneously calculated to control the position of, for example, an intermediate transfer belt or a conveying belt of an image forming apparatus in a bias direction of the belt (the direction perpendicular to the moving direction).

According to any one of the embodiments, it is possible to improve the detection accuracy of, for example, surface speed of an intermediate transfer belt in an image forming apparatus and achieve the high-accuracy belt conveyance control, and also possible to provide an image forming apparatus that outputs a high-quality image with less color shift and less position shift, furthermore, it is possible to achieve the speeding up of a calculation process by load reduction, the simplification of the calculation process, and the reduction in cost of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A moving-body detecting device comprising:

an image acquiring device including, a single light source configured to emit light beams to a first detection position and a second detection position, the second detection position being apart from the first detection position in a moving direction of a moving-body, and an optical image synthesizer opposite the first detection position and the second detection position, the optical image synthesizer configured to split the light beam emitted from the single light source into two beams to be emitted to two areas, respectively; and an area sensor arranged to capture images of the first detection position and the second detection position, wherein a moving state of the moving-body is detected from the captured images.

2. The moving-body detecting device according to claim 1, wherein the image acquiring device includes a semiconductor laser.

3. The moving-body detecting device according to claim 1, wherein the area sensor is configured to acquire a two-dimensional image, and simultaneously calculate a speed of the moving-body and a movement of the moving-body in a direction perpendicular to the moving direction.

4. An image forming apparatus comprising:

the moving-body detecting device according to claim 1, wherein the moving-body is an intermediate transfer belt or a conveying belt.

5. The moving-body detecting device according to claim 1, further comprising:

a controller configured to calculate a speed of the moving-body on a basis of correlation image data obtained by performing a cross-correlation operation.

6. The moving-body detecting device according to claim 1, wherein the single light source is arranged so as to emit a laser light to an outer surface of the moving-body from an oblique direction.

7. The moving-body detecting device according to claim 1, wherein the single light source includes a semiconductor laser.

8. The moving-body detecting device according to claim 1, further comprising:

a controller configured to instruct the image acquiring device to acquire an image in response to a trigger signal.

9. The moving-body detecting device according to claim 1, wherein a member fixing the area sensor is made of glass.

10. The moving-body detecting device according to claim 1, wherein a member fixing the area sensor is made of metal.

* * * * *